Patented Jan. 26, 1954

2,667,478

UNITED STATES PATENT OFFICE 2,667,478

ACID ESTERS OF FATTY ACYLATED N-ALKYLGLUCAMINES

Anthony M. Schwartz, Washington, D. C., assignor to Commercial Solvents Corporation, Terre Haute, Ind., a corporation of Maryland No Drawing. Application October 26, 1950,
Serial No. 192,372

7 Claims. (Cl. 260—211)

My invention relates to a new group of chemical compounds. More particularly, it relates to acid esters of acylated N-alkylglucamines and to a method for their preparation.

The compounds falling within the scope of my invention include those having the structural formula:

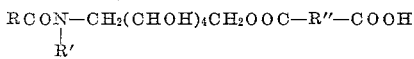

wherein R' represents a member selected from the group consisting of alkyl radicals having 1 to 6 carbon atoms inclusive, and hydroxyalkyl radicals having 1 to 6 carbon atoms inclusive; R represents the hydrophobic residue of a carboxylic acid having 8 to 30 carbon atoms inclusive; and R'' represents a member selected from the group consisting of —$CH_2OCH_2$—, —$C_6H_4$— and alkylene radicals having 2 to 4 carbon atoms inclusive and which contain not more than one double bond and not more than two hydroxyl groups as substituents. Specific examples of radicals of the type covered in the definition of R include the straight chain saturated alkyl radicals from $C_7H_{15}$ to $C_{17}H_{35}$ and the straight chain olefinic radical $C_{17}H_{33}$, as well as radicals of other carboxylic acids having surface active properties such as, for example, rosin acids, alkylbenzoic acids, (alkylphenoxy) acetic acids, naphthenic acid, hydroxylated long chain fatty acids such as ricinoleic acid, etc. Specific examples of R' include methyl, ethyl, isopropyl, butyl, etc. Specific examples of radicals of the type covered by the definition of R'' include the radicals characteristic of diglycolic, maleic, malic, phthalic, tartaric, succinic, glutaric, and adipic acids.

Also included in my invention are the alkali metal, alkaline earth metal and ammonium salts of the above described amide acid esters.

The acid esters of the acylated N-alkylglucamines included in my invention can be prepared by condensing a suitable dicarboxylic acid, or acid anhydride thereof, with a suitable acylated N-alkylglucamine. Dicarboxylic acids suitable for use in my invention include diglycolic, maleic, phthalic, malic, tartaric, succinic, glutaric and adipic acids.

The acylated N-alkylglucamines which can be used in accordance with my invention include all those having the formula:

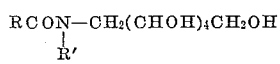

wherein R and R' have the values defined above.

These acylated N-alkylglucamines can be prepared by condensing a suitable acid with an N-alkylglucamine in accordance with the method described in U. S. Patent No. 1,985,424, issued to Henry Alfred Piggott, or by condensing an aliphatic ester of an acid with an N-alkylglucamine as described in my co-pending application, U. S. Serial No. 164,286, filed May 25, 1950.

I prefer to condense at least one mole of the acid or anhydride with about one mole of acylated N-alkylglucamine. The condensation can be carried out in any suitable reaction vessel, with agitation and at temperatures between about 60 and 120° C. The acid esters are converted to salts by reaction with an alkali metal base, alkaline earth metal base or ammonium base, such as the hydroxides, carbonates or bicarbonates.

As disclosed in my said co-pending application, U. S. Serial No. 164,286, I have discovered that fatty acylated N-alkylglucamines are useful as detergents. The usefulness of some of these compounds as detergents, however, is limited due to relatively poor solubility in water. Likewise, from the standpoint of consumer psychology it is extremely important that a commercial detergent produce a large quantity of stable foam when agitated in aqueous solutions. Some of the acylated N-alkylglucamines give only small quantities of unstable foam. I have now discovered that the products of the present invention are not subject to these disadvantages, and on the contrary have high solubility in water and produce large quantities of a very stable foam. In addition, my new compounds possess excellent lime resistance, are good emulsifiers for mineral oil and water and possess high detergency powers. A better understanding of the nature of my invention can be had by reference to the following examples, which are given by way of illustration only and are in no way intended to limit the scope of my invention.

Example I

One mole of the N-methylglucamide of oleic acid and 1.1 moles of diglycolic anhydride were mixed together and warmed to 75–80° C. with good stirring for ten minutes. The reaction was spontaneous and mildly exothermic. At reaction temperature the mixture was a semi-liquid viscous paste. The product was then cooled, dissolved in twice its weight of water and salted out. This latter operation removed excess diglycolic acid. The product was determined to be the half ester by its solubility in aqueous alkaline solution.

The separated amide ester acid was then neutralized with soda ash solution, and the sodium salt finally dried. The product showed high water solubility in both acid and alkaline solutions. It had good lime resistance, and the foaming properties were markedly better than those of the oleic amide of N-methylglucamine used as the starting material.

*Example II*

In the table below are given the results of a series of operations in which various dicarboxylic acids or their anhydrides were condensed with various fatty acylated N-alkylglucamines. In each instance the compounds were prepared substantially as described in Example I, except that different temperatures between 60 and 120° C. were used and the acid esters were neutralized with sodium hydroxide. The amides were all prepared by condensing an acid with an N-alkyl-glucamine according to the procedure of U. S. Patent No. 1,985,424. The detergency tests to which these specific compounds were subjected are widely used and well recognized by technologists who have specialized in this field. They consist in washing swatches of standard soiled fabrics under controlled conditions with a standard aqueous solution of the detergent in a Launder-O-Meter instrument, and estimating the degree of soil removal by means of a photometer. In these tests a ten minute washing interval and a temperature of 50° C. were used. The following table gives the results of detergency tests using ten different detergents of my invention as well as six parent amides which are included for comparative purposes.

TABLE

| Detergent | Concentration Percent Active | Soil Removal, 6DC Cotton | Efficiency, 6DC Wool |
|---|---|---|---|
| Cocoanut fatty amide of N-methyl-glucamine | 0.05 / 0.1 | 18 / 22 | 56 / 57 |
| Diglycolic half ester of the cocoanut fatty amide of N-methyl-glucamine | 0.05 / 0.1 | 19 / 22 | 52 / 80 |
| Oleic amide of N-methyl-glucamine | 0.05 / 0.1 | 12 / 17 | 40 / 47 |
| Diglycolic half ester of the oleic amide of N-methyl-glucamine | 0.05 / 0.1 | 13 / 17 | 48 / 71 |
| Maleic ester of the oleic amide of N-methylglucamine | 0.05 / 0.1 | 15 / 20 | 54 / 63 |
| Lauric amide of N-methyl-glucamine | 0.05 / 0.1 | 22 / 19 | 54 / 55 |
| Diglycolic half ester of the lauric amide of N-methyl-glucamine | 0.05 / 0.1 | 19 / 21 | 60 / 78 |
| Stearic amide of N-methyl-glucamine | 0.05 / 0.1 | 14 / 14 | 38 / 39 |
| Diglycolic half ester of the stearic amide of N-methyl-glucamine | 0.05 / 0.1 | 15 / 22 | 39 / 59 |
| The cocoanut fatty amide of N-methylglucamine | 0.05 / 0.1 | 9 / 15 | 24 / 27 |
| Diglycolic half ester of the cocoanut fatty amide of N-isopropyl-glucamine | 0.05 / 0.1 | 9 / 22 | 31 / 49 |
| Phthalic ester of the oleic amide of N-methylglucamine | 0.05 / 0.1 | 18 / 18 | 53 / 58 |
| Oxalic ester of the oleic amide of N-methylglucamine | 0.05 / 0.1 | 16 / 20 | 47 / 70 |
| The cocoanut fatty amide of N-isopropylglucamine | 0.05 / 0.1 | 9 / 12 | 25 / 28 |
| Maleic ester of the cocoanut fatty amide of N-isopropyl-glucamine | 0.05 / 0.1 | 12 / 17 | 47 / 65 |
| Phthalic ester of the cocoanut fatty amide of N-isopropyl-glucamine | 0.05 / 0.1 | 14 / 17 | 41 / 60 |

I claim:

1. As a new composition of matter, a compound selected from the group consisting of the compound having the formula:

$$RCON-CH_2(CHOH)_4CH_2OOC-R''-COOH$$
$$\quad\quad\quad | $$
$$\quad\quad\quad R'$$

wherein R' represents a member selected from the group consisting of alkyl radicals having 1 to 6 carbon atoms inclusive; R represents the hydrophobic residue of a carboxylic acid having 8 to 30 carbon atoms inclusive, and R'' represents a member selected from the group consisting of —CH$_2$OCH$_2$—, —C$_6$H$_4$— and alkylene radicals having 2 to 4 carbon atoms inclusive and which contain not more than one double bond and not more than two hydroxyl groups as substituents, and the alkali metal, alkaline earth metal and ammonium salts of the said amide ester acids.

2. The process for producing compounds having the formula:

$$RCON-CH_2(CHOH)_4CH_2OOC-R''-COOH$$
$$\quad\quad\quad | $$
$$\quad\quad\quad R'$$

wherein R' represents a member selected from the group consisting of alkyl radicals having 1 to 6 carbon atoms inclusive, R represents the hydrophobic residue of a carboxylic acid having 8 to 30 carbon atoms inclusive, and R'' represents a member selected from the group consisting of —CH$_2$OCH$_2$—, —C$_6$H$_4$—, and alkylene radicals having 2 to 4 carbon atoms inclusive and which contain not more than one double bond and not more than two hydroxyl groups as substituents, which comprises condensing about one mole of an acylated N-alkylglucamine having the formula:

$$RCON-CH_2(CHOH)_4CH_2OH$$
$$\quad\quad\quad | $$
$$\quad\quad\quad R'$$

wherein R and R' have the values defined above, with at least one mole of a compound selected from the group consisting of a dicarboxylic acid and an anhydride thereof, at temperatures between about 60 and 120° C.

3. The composition of claim 1 wherein R' is methyl, R is the hydrophobic residue of cocoanut fatty acid and R'' is —CH$_2$—O—CH$_2$—.

4. The composition of claim 1 wherein R' is methyl, R is the hydrophobic residue of oleic acid, and R'' is —CH$_2$—O—CH$_2$—.

5. The composition of claim 1 wherein R' is methyl, R is the hydrophobic residue of cocoanut fatty acid and R'' is —C$_6$H$_4$—.

6. The composition of claim 1 wherein R' is methyl, R is the hydrophobic residue of lauric acid and R'' is —CH=CH—.

7. The composition of claim 1 wherein R' is ethyl, R is the hydrophobic residue of stearic acid and R'' is —CH$_2$—O—CH$_2$—.

ANTHONY M. SCHWARTZ.

References Cited in the file of this patent

UNITED STATES PATENTS

| Number | Name | Date |
|---|---|---|
| 1,985,424 | Piggott | Dec. 25, 1934 |
| 2,091,105 | Piggott | Aug. 24, 1937 |
| 2,094,608 | Kritchevsky | Oct. 5, 1937 |
| 2,183,853 | Haussmann et al. | Dec. 19, 1939 |
| 2,375,529 | De Groote et al. | May 8, 1945 |